United States Patent [19]

Robinson

[11] 4,192,943

[45] Mar. 11, 1980

[54] METHOD FOR REDUCING OLIGOMERIC CYCLIC ETHER CONTENT OF A POLYMERIZATE

[75] Inventor: Ivan M. Robinson, Wilmington, Del.

[73] Assignee: E. I. Du Pont de Nemours and Company, Wilmington, Del.

[21] Appl. No.: 970,733

[22] Filed: Dec. 21, 1978

Related U.S. Application Data

[63] Continuation-in-part of Ser. No. 915,190, Jun. 13, 1978, abandoned.

[51] Int. Cl.$^2$ .............................................. C08G 65/30
[52] U.S. Cl. ................................... 528/417; 528/482; 568/617; 568/621
[58] Field of Search ................ 528/417, 482; 568/617, 568/621

[56] References Cited

U.S. PATENT DOCUMENTS

| | | | |
|---|---|---|---|
| 2,510,540 | 6/1950 | Ballard et al. | 260/615 |
| 2,520,733 | 8/1950 | Morris et al. | 260/615 |
| 3,053,903 | 9/1962 | Holland | 260/615 |
| 3,925,484 | 12/1975 | Baker | 260/615 B |

FOREIGN PATENT DOCUMENTS 854958  11/1960  United Kingdom .

OTHER PUBLICATIONS

Okuneva et al., Purification of Tetrahydrofuran–"Propylene Oxide Copolymers," Chemical Abstracts 71, 113659f (1969).

Jefferson Chemical, "Prevention of Haze Formation", Chemical Abstracts 75, 7767n (1971).

*Primary Examiner*—Earl A. Nielsen

[57] ABSTRACT

The oligomeric cyclic ether content of a tetrahydrofuran/alkylene oxide polymerizate is significantly reduced by bringing the polymerizate into contact with an acid-activated sodium or calcium montmorillonite clay.

6 Claims, No Drawings

4,192,943

METHOD FOR REDUCING OLIGOMERIC CYCLIC ETHER CONTENT OF A POLYMERIZATE

CROSS REFERENCE TO RELATED APPLICATION

This application is a continuation-in-part of application Ser. No. 915,190, filed June 13, 1978, now abandoned.

DESCRIPTION

1. Technical Field

This invention relates to a method for reducing the oligomeric cyclic ether content of a tetrahydrofuran (THF)/alkylene oxide polymerizate. It is more particularly directed to a method whereby the oligomeric cyclic ether content of a THF/alkylene oxide polymerizate is significantly reduced by bringing the polymerizate into contact with an acid-activated sodium or calcium montmorillonite clay.

2. Background Art

THF/alkylene oxide polymerizates are known and have been used in the preparation of polyurethanes. When prepared by conventional processes, these THF/alkylene oxide polymerizates can contain as much as 7–15%, by weight, of oligomeric cyclic ether byproducts.

The presence of these oligomeric cyclic ethers in the polymerizates can be undesirable for several reasons. First, the ethers are nonfunctional impurities and can represent an economic penalty to a purchaser of a polymerizate because up to 7–15% of the material purchased contains no reactive hydroxyl groups and may therefore be useless for the purpose intended. Secondly, when these polymerizates are used in preparing polyurethanes, the presence of the oligomeric cyclic ether byproducts tends to degrade the polyurethane's properties. This degradation manifests itself in much the same way as that encountered when an excess of plasticizer is used: the lower molecular weight oligomeric cyclic ethers vaporize slowly at high temperatures and are leached out by water and common organic liquids, which results in weight loss and undesirable dimensional changes in the polyurethane product.

The need therefore exists for a simple inexpensive method for significantly reducing the oligomeric cyclic ether content of THF/alkylene oxide polymerizates. This need is filled by the process of the invention, whereby the oligomeric cyclic ether content of such a polymerizate is significantly reduced by bringing it into contact with an acid-activated sodium or calcium montmorillonite clay.

DISCLOSURE OF THE INVENTION

The THF/alkylene oxide polymerizates whose oligomeric cyclic ether contents are reduced according to the process of the invention can be any of those produced by known methods of preparing copolyether glycols based on THF and alkylene oxides. Illustrative of such methods is that shown in British Pat. No. 854,958. The disclosures of that patent are incorporated into this application by reference to show how such polymerizates are prepared.

"Alkylene oxide", as used herein, means a compound containing two or three carbon atoms in its alkylene oxide ring. The alkylene oxide can be unsubstituted or substituted with, for example, alkyl or aryl groups or halogen atoms. Illustrative of such compounds are ethylene oxide, 1,2-propylene oxide, 1,3-propylene oxide, 1,2-butylene oxide, 1,3-butylene oxide, 2,2-bis-chloromethyl-1,3-propylene oxide and epichlorohydrin. The polymerizates most commonly processed according to the invention are THF/ethylene oxide polymerizates and THF/1,2-propylene oxide polymerizates.

The polymerizates are used in substantially monomer-free form, i.e., a form from which most of the unreacted monomers have been removed, only insignificant amounts remaining. This is ordinarily done by vacuum stripping, using conventional techniques.

The oligomeric cyclic ether content of the raw polymerizates appears to be independent of the molecular weights and THF/alkylene oxide ratios of the copolyether glycols contained in them, but does vary with their method of production. The polymerizates usually contain about 7–15%, by weight, of the ethers, and in some cases may contain as much as 15–18%.

As used herein, "oligomeric cyclic ether" means a compound having a calculated molecular weight of less than about 500 and containing two or more of the following units linked together:

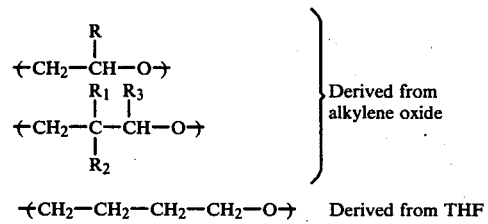

where R, $R_1$, $R_2$ and $R_3$ are hydrogen, methyl, ethyl or halomethyl.

Illustrative of such oligomeric cyclic ethers are those represented in the following table:

| Composition Number Ratio of Alkylene Oxide Units to THF Units | |
|---|---|
| 2:1 | 1:4 |
| 1:2 | 3:3 |
| 3:1 | 5:2 |
| 2:2 | 2:4 |
| 4:1 | 4:3 |
| 1:3 | 6:2 |
| 3:2 | 3:4 |
| 5:1 | 5:3 |
| 2:3 | 2:5 |
| 4:2 | 4:4 |

Any catalyst grade sodium or calcium montmorillonite clay can be used in the process of the invention. Granular clays are preferred because they are easy to separate from the product of the process. "Granular" in this context defines a particulate clay which passes through a 3.5 mesh U.S. Sieve (−3.5 mesh), but is retained on a 60 mesh U.S. Sieve (+60 mesh).

Preferred for its availability and low cost is a type of naturally occurring granular sodium montmorillonite clay known as Wyoming bentonite. A clay of this class, "Volclay" bentonite, is sold by American Colloid Company of Skokie, ILL.

These clays are acid-activated by the usual methods, using such mineral acids as sulfuric, hydrochloric, phosphoric (all forms) or nitric, or strong organic acids such as formic or acetic.

Also preferred for use in the process of the invention are calcium montmorillonite clays sold by Süd Chemie AG of Munich, Germany, as "Tonsil" KO and by Filtrol Corp. of Los Angeles, CA as Filtrol 24. These clays are supplied in the acid-treated form and can be used directly.

The process of the invention is begun by bringing the clay and the THF/alkylene oxide polymerizate into contact to form a reaction mixture which contains 1–50%, preferably 3–10%, by weight, of the clay. The mixture is continuously stirred and brought to a temperature of 70°–150° C., preferably 80°–120° C., and held there, preferably under a vacuum of 13.3 kilopascals (100 mm of Hg) or less, with agitation, until its oligomeric cyclic ether content has been significantly reduced. "Significantly reduced" in most cases, means that the oligomeric cyclic ether level has been brought down to about 1.5–3%, by weight of the polymerizate. It may be possible to reduce the oligomeric cyclic ether content even further by running the process for periods longer than those disclosed herein, or by raising the temperature at which it is run above the disclosed levels, but when the latter is done, the polymerizate tends to discolor and undesirable side reactions tend to be induced. The use of vacuums of less than 13.3 kilopascals favors shorter processing times.

The time required to reach the 1.5–3% oligomeric cyclic ether level varies with the original cyclic ether content of the polymerizate and the temperature at which the process is conducted, but normally that level will be reached in ½–10 hours, the higher process temperatures favoring shorter times.

Oligomeric cyclic ether (OCE) content is determined by programmed gas chromatography, using a stainless steel column having a length of 3.048 meters (10 feet) and an outside diameter of 3.175 mm (⅛ inch), packed with 5% by weight of "OV-101", a methyl silicone oil sold by Supelco, Inc., supported on 100–120 U.S.S. mesh "Chromsorb G," sold by Hewlett-Packard, Inc. The column is in an oven whose temperature is programmed to rise from 70°–300° C. at the rate of 30° C. per minute, with a 12 minute hold time at 300° C. before the cycle is repeated, and which has a glass liner for the injection port, which liner must be replaced frequently to prevent contamination of the port with nonvolatile fractions of sample. The instrument may be equipped with an integrator to determine the concentration of unknown in the sample. The determination is conducted under the following conditions:

| | |
|---|---|
| Injection port temperature | 280° C. |
| Thermal conductivity detector setting | 320° C. @150 milliamperes |
| Carrier gas @ gas flow | Helium @30 cubic centimeters per minute |
| Sample size | 10 microliters |
| Internal Standard | Dimethyl ether of triethylene glycol |

The procedure is standardized by first preparing three standard solutions containing, respectively, 2%, 5% and 10% by weight of purified OCE in tetrahydrofuran. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\% \text{ OCE in standard}) (\text{area \% of internal standard}) \times (\text{weight of standard solution})}{(\text{area \% of OCE}) (\text{weight of internal standard}) (100)}$$

Average response factor, $RF_a$, is found by averaging the six response factors thus calculated.

The determination of OCE content is carried out by first preparing a sample of THF/alkylene oxide polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation $$\text{Weight percent of OCE} = \frac{\text{area \% of OCE}}{\text{area \% of internal standard}} \times 10\, RF_a$$

Purified OCE is obtained by first distilling a raw THF/alkylene oxide polymerizate (the alkylene oxide being the same as that in the copolymer of the unknown) in a 5.08 cm (2-inch) Pope wiped film molecular still, sold by Pope Scientific, Inc., Menomonee Falls, WIS. The distillation is carried out at 170°–190°0 C. and a pressure of less than about 26 Pa (0.2 mm of mercury), with an input rate of about 1 drop per second.

Two hundred parts by weight of the distillate are mixed with 60 parts by weight of 2,4-toluene diisocyanate and 3 drops of dibutyltin dilaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pages 357–359. Enough ethylene glycol to give an isocyanate/hydroxyl mole ratio of about 1.1 is added to the mixture, which is then brought to 100° C. and held there for two hours, with stirring, to complete conversion to a polyurethane. The resulting mixture containing the inert OCE is then extracted with diethyl ether and the extract concentrated on a rotary evaporater at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

When the process of the invention is run at the preferred temperatures, THF, water and various by-products are given off from the reaction mass. These substances can be withdrawn from the reaction zone by sweeping it with an inert gas such as nitrogen or by running the process under vacuum. THF can be separated from the other byproducts by fractional distillation and can be recycled to the THF/alkylene oxide reaction if desired.

The process of the invention can be run batchwise or in a continuous fashion. When run continuously, the process is preferably run in stages to avoid the adverse effects of backmixing, as is well known in the art. In the continuous mode, the clay is held in the reaction zone by the use of suitable filters or screens. When the process is run batchwise, the liquid product is removed from the reaction vessel, for example by decantation or through a screen, leaving the clay behind. The vessel can then be refilled and a new reaction begun, using the original clay.

The product of the process of the invention is a THF/alkylene oxide polymerizate which, after final filtration, can be used directly for whatever purpose intended, without the need for further processing or purification.

EXAMPLE (Best Mode)

A reaction vessel was charged with 40 parts by weight, of acid-activated "Volclay" KWK bentonite and 1000 parts, by weight, of a substantially monomer-free THF/ethylene oxide polymerizate containing 36%, by weight of ethylene oxide units and 7.2%, by weight, of oligomeric cyclic ethers. This reaction mixture was brought to 100° C. and held there, with stirring, at a pressure of 1333 Pa (10 mm of mercury), for four hours. The mixture was then cooled to ambient temperature under nitrogen, the bentonite was allowed to settle, and the polymerizate was separated from the bentonite by decantation.

The polymerizate contained 2.9%, by weight, of oligomeric cyclic ethers, as determined by the gas chromatographic method described earlier.

INDUSTRIAL APPLICABILITY

The process of the invention can be used as a final step in the production of THF/alkylene oxide polymerizates, especially those based on ethylene oxide and propylene oxide. The polymerizates can then be used in the preparation of polyurethanes according to methods well known in the art.

I claim:

1. A method for reducing the oligomeric cyclic ether content of a substantially monomer-free THF/alkylene oxide polymerizate, the method comprising bringing the polymerizate into contact, at a temperature of 70°–150° C., with 1–50%, by weight of the polymerizate, of an acid-activated sodium or calcium montmorillonite clay, for a time sufficient to significantly reduce the oligomeric cyclic ether content of the polymerizate.

2. The method of claim 1 wherein the clay is an acid-activated Wyoming bentonite.

3. The method of claim 1 run at a temperature of 80°–120° C.

4. The method of claim 1 wherein the concentration of the clay is 3–10% by weight of the polymerizate.

5. The method of claim 1 wherein the polymerizate is of THF and ethylene oxide.

6. The method of claim 1 wherein the polymerizate is of THF and ethylene oxide, the clay is an acid-activated Wyoming bentonite at a concentration of 3–10%, by weight of the polymerizate, and the method is run at a temperature of 80°–120° C.

* * * * *